358-86. XR 3,594,496 SR

[redacted]

United States Patent

[11] 3,594,496

[72] Inventor Gabriel Ralph Parton
Chobham, nr. Woking, Surrey, England

[21] Appl. No. 805,692
[22] Filed Mar. 10, 1969
[45] Patented July 20, 1971
[73] Assignee Communications Patents Limited
[32] Priority Mar. 13, 1968
[33] Great Britain
[31] 12181/68

[54] WIRED BROADCASTING SYSTEMS
14 Claims, 2 Drawing Figs.

[52] U.S. Cl. .......... 178/5.2 R, 178/69.5 TV, 325/308, 178/DIG. 13
[51] Int. Cl. .......... H04n 9/02, H04n 5/04
[50] Field of Search .......... 178/5.2, 5.4, 6 PD, 69.5; 325/308

[56] References Cited

UNITED STATES PATENTS

| | | | |
|---|---|---|---|
| 3,278,675 | 10/1966 | Gargini .......... | 178/5.4 X |
| 3,350,647 | 10/1967 | Gabriel et al. .......... | 325/308 |

*Primary Examiner*—Richard Murray
*Attorney*—Laurence R. Brown

ABSTRACT: A wired television transmission system is disclosed for conveying a plurality of programs over a communication channel while reducing interference patterns. Thus, several program sources are synchronized and modulated with common signals. This eliminates beat signal patterns. The signals are sent out in a common cable through twisted pairs, each having a different pitch to minimize cross-coupling.

Figure 1:
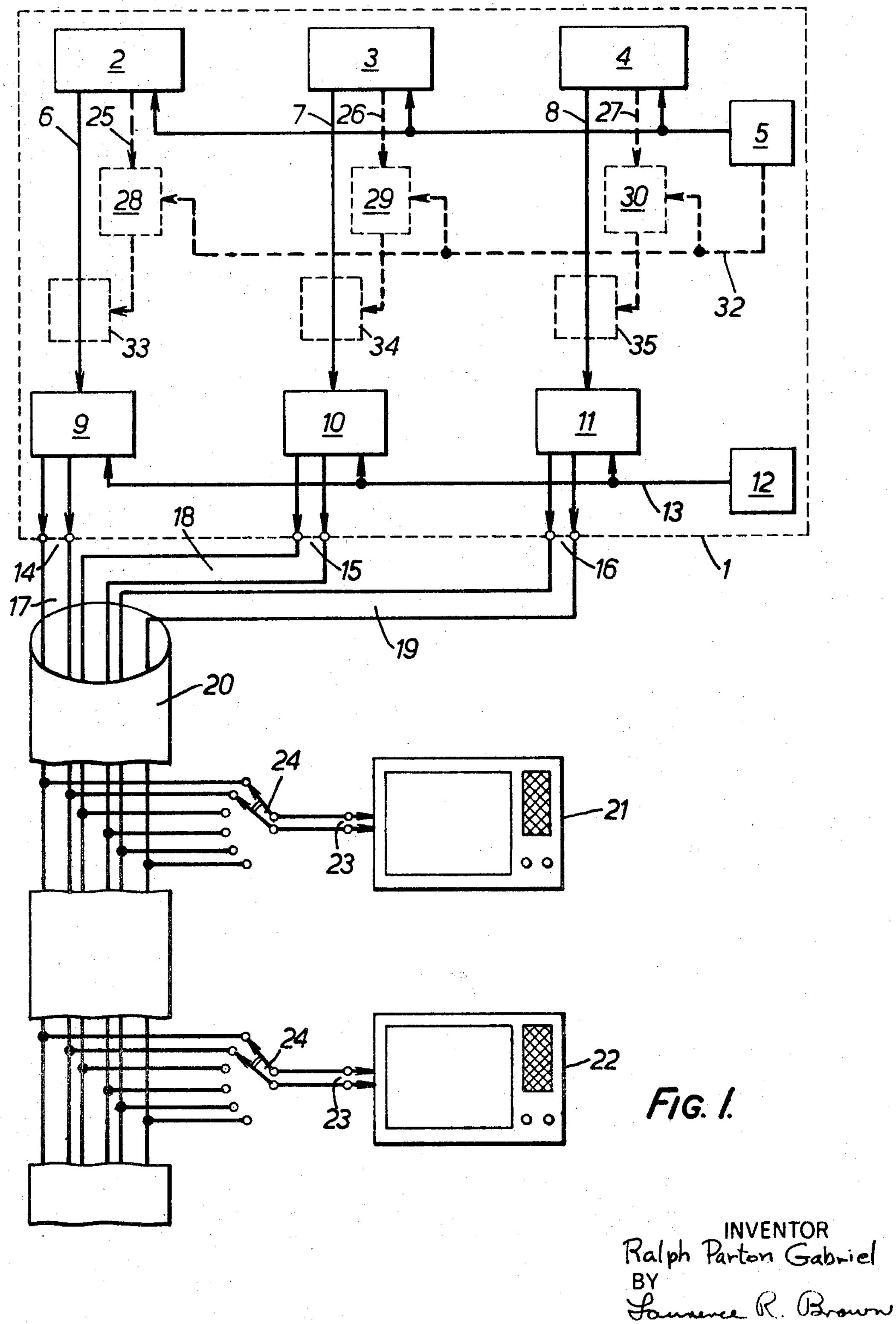

INVENTOR
Ralph Parton Gabriel
BY
Laurence R. Brown
ATTORNEY

INVENTOR
Ralph Parton Gabriel
BY
Laurence R. Brown
ATTORNEY

WIRED BROADCASTING SYSTEMS

This invention relates to wired broadcasting systems capable of carrying a plurality of television signals relating to different programs and seeks to provide an improved form thereof.

An object of the present invention is to provide a multiprogram wired broadcasting system in respect of television signals wherein the signals may be transmitted over separate conductor pairs contained within a common cable with a minimum degree of mutual interference which may arise as a result of the interaction between signals pertaining to different programs due to cross-coupling from one signal pair to another in said cable.

Accordingly the invention provides a multiprogram wired broadcasting system in respect of television signals which comprise a plurality of television signal sources each relating to a different one of said programs each of said television signals including synchronizing signals derived from a common synchronizing source, modulator means for modulating a corresponding high-frequency carrier wave in respect of each of said television signals, means for energizing a corresponding pair of conductors of the wired network of said system in respect of each television signal and a plurality of television receivers arranged for selective connection to said pairs of conductors of the wired network to derive therefrom television signals in respect of a selected one of said programs.

More specifically, the invention provides a transmitting apparatus for a wired broadcasting system in respect of television signals which comprises a plurality of television signal sources each relating to a different one of said programs, a synchronizing signal generator means associated with each television signal source, an alternating-current signal source, means for making available at each television signal source said alternating signal, means for controlling the frequency and phase of the synchronizing signals provided by said synchronizing signal generator means at each television signal source in dependence upon the frequency and phase of said alternating-current signal whereby the television signals produced by each of said television signal sources are generated in unison, means for receiving at a wired broadcasting substation at least some of said plurality of television signals, means for translating the received signals to a common carrier wave frequency and means for applying said frequency translated television signals to different conductor pairs of a wired broadcasting cable network.

The common synchronizing source may comprise either a single synchronizing pulse generator for providing directly the synchronizing signals for each program or an alternating-current signal source, such for example, as a frequency standard transmission to which are locked a plurality of synchronizing pulse generators, one in respect of each of said television signal sources.

It may be advantageous to arrange that a high-frequency carrier wave in respect of each of the plurality of television signals is controlled by or derived from a common high-frequency oscillator device whereby the frequencies of the carrier waves of the television signals in respect of each program are identical.

In the case of color television programs a color television signal source may provide separate brightness and color signals, the color signals being arranged each to modulate a corresponding high frequency subcarrier wave, said subcarrier waves having a frequency bearing a common relationship to the synchronizing signals pertaining to said programs whereby their frequencies are identical. Transmission of these modulated subcarrier waves in respect of the color signals may be effected by combining each of said modulated subcarrier waves with its corresponding brightness signal prior to the application of said brightness signal to the modulator means.

Figure 2:
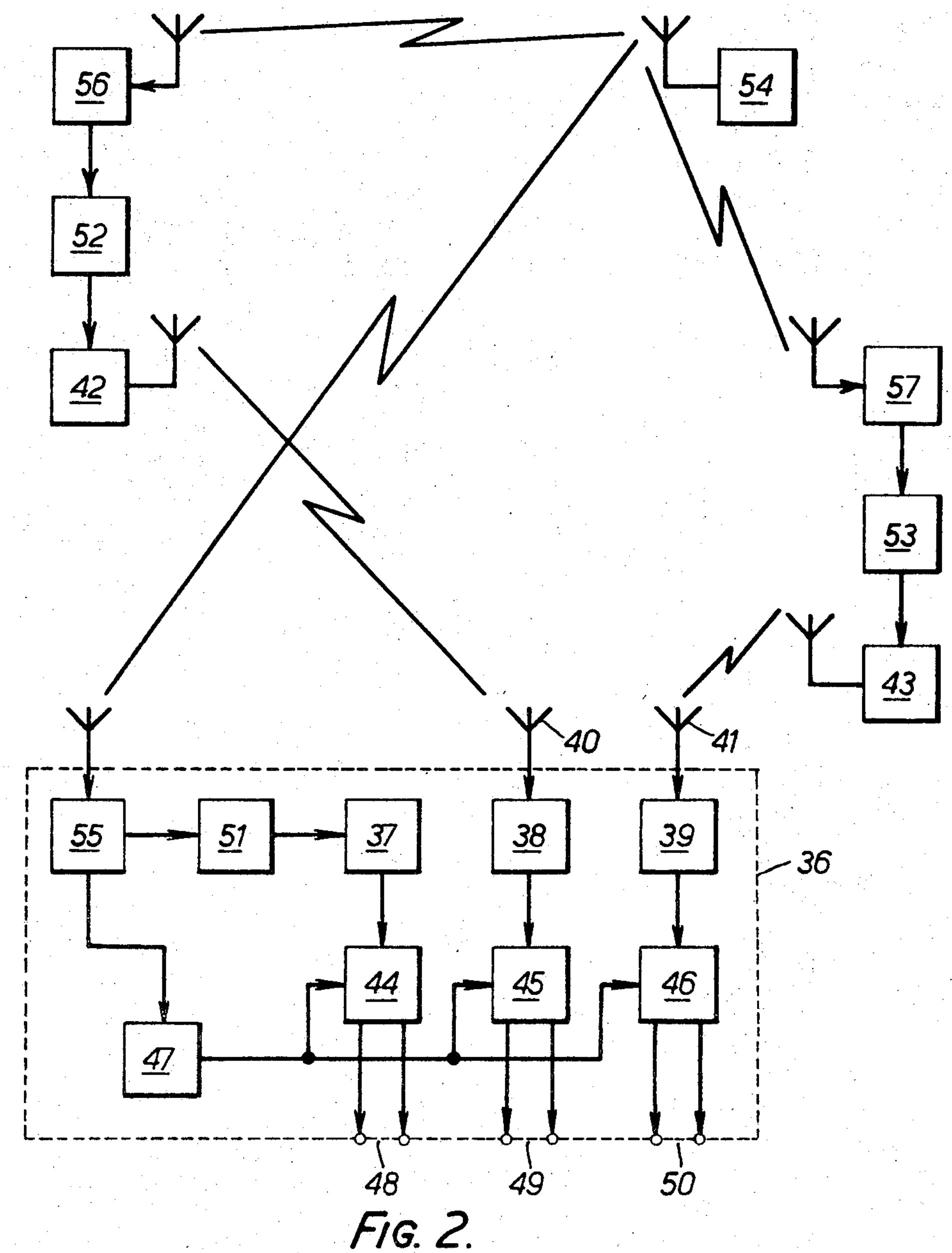

In order that the invention may be more readily understood two particular embodiments thereof will now be described by way of example only, with reference to the accompanying drawings in which:

FIG. 1 is a block schematic diagram of a wired broadcasting system in accordance with the present invention, and FIG. 2 is a block schematic diagram of a transmitting apparatus and substation for a wired broadcasting system of the kind shown in FIG. 1.

The wired broadcasting system shown in FIG. 1 is arranged to provide three television programs to its subscribers and comprises a central station 1 which includes three television signal sources, 2, 3, 4 each relating to a different program. These three signal sources are each arranged to provide a television signal pertaining to its respective program including synchronizing signals. The synchronizing signals from these three sources are derived from a common synchronizing pulse generator 5, the picture signals provided by each of said sources 2, 3, and 4 thereby being transmitted in unison. The television signals provided by said sources are made available on respective output lines 6, 7 and 8 these signals being passed to corresponding modulator means 9, 10, 11 wherein they are arranged to effect amplitude modulation of a carrier wave.

The carrier wave applied to each of said modulator devices is derived from a common oscillator device 12 over the line 13 so that the resulting modulated high-frequency carrier waves in respect of each television program have identical frequencies so that any cross-coupling in the wired network will not give rise to beat product interference between the carrier waves employed for transmitting the picture signals of the programs. Conveniently the frequency of the carrier wave provided by the oscillator device 12 lies in the range 4—11 MHz., and preferably is about 5.4 MHz.

The modulated high-frequency carrier waves provided by the modulator devices in respect of the television programs are made available at respective pairs of output terminals 14, 15 and 16. To these pairs of output terminals there are connected corresponding conductor pairs 17, 18 and 19 of the wired network of the system, said conductor pairs being contained within a common cable 20. It is usual in high frequency wired broadcasting systems for the conductor pairs carrying the high-frequency television signals to be formed of two insulated conductors twisted together, the pitch of each pair differing from the others whereby cross-coupling between one pair and another is minimized. However, a degree of cross-coupling may still exist which is sufficient to give rise to interference on one program from the others. By transmitting the picture signals in unison any interference of this nature will occur outside the active picture area displayed by the subscribers terminal units and thus the degree of protection required between the conductor pairs in the cable 20 for providing satisfactory reception of the television programs may be reduced compared with the degree of protection required when the picture signals are transmitted randomly one with respect to the others.

Subscribers' terminal units, such as shown at 21, 22 are arranged to receive at their input terminals 23 the high frequency television signals being carried by one of the conductor pairs 17, 18, 19. The switch device 24 is provided in respect of each subscriber's terminal unit whereby its input terminals 23 may be connected to a selected one of the conductor pairs 17, 18, 19 whereby said terminal unit may be effective to reproduce the television signals in respect of the television program carried by the selected conductor pair.

In the case of color television programs the program sources 2, 3 and 4 are arranged to provide brightness information signals in respect of that program on their output lines 6, 7 and 8 and separate color information in respect of that program on output lines 25, 26, 27. It is usual for the color information to be transmitted as a modulation component of a suppressed carrier wave subcarrier signal. The color information signals are thus arranged to be applied to corresponding subcarrier modulators 28, 29, 30, the high frequency carrier wave applied to said subcarrier modulator devices being derived from the common synchronizing pulse generator 5. The frequency of the subcarrier provided by the synchronizing pulse generator 5 has a fixed relationship to the frequency of the synchronizing signals and, in the case of transmission of the 625-line standard may conveniently be about 4.4 MHz. By the use of a common subcarrier oscillator frequency the production of beat product interference between the subcarriers in respect of the television programs due to cross-coupling in the cable is eliminated. The modulated subcarrier waves in respect of the color signals apertaining to each television program may be transmitted by being combined with its corresponding brightness information signal prior to the application of this brightness signal to its respective one of the modulator devices 9, 10, 11. This combination may conveniently be effected by applying the output signals from the color subcarrier modulators 28, 29 and 30 to respective signal combining devices 33, 34 and 35 arranged in series with the output lines 6, 7 and 8.

In a practical wired broadcasting system it will often be inconvenient to arrange the television program sources to be at a common location with their synchronizing signals derived from a common synchronizing pulse generator such as shown at 5 in FIG. 1. In such cases the alternative arrangement of a transmitting apparatus and substation as shown in FIG. 2 may be employed.

In FIG. 2 the substation 36 is arranged to provide three television programs for the subscribers of the wired broadcasting network one from a local television signal source 37 and two from remote television signal sources through the intermediary of radio receiving devices 38, 39 which are arranged to receive by means of corresponding aerials 40, 41 television picture signals radiated by broadcasting transmitters 42, 43. The signal source 37 and receivers 38 and 39 are arranged to provide video signals for application to corresponding modulator devices 44, 45, 46 wherein said video signals are arranged to modulate a high-frequency carrier wave provided by a common oscillator device 47. The modulated, high-frequency carrier waves, preferably in the range 4—11 MHz., in respect of the three television programs are made available at corresponding pairs of output terminals 48, 49, 50. A respective conductive pair of the wired broadcasting network may be connected to each of these pairs of output terminals in the manner described in connection with the arrangement shown in FIG. 1, the subscribers' terminal units being arranged for selective connection to a desired one of said pairs to reproduce the television program carried thereby.

In the system shown in FIG. 2 each television program source is arranged to provide a television signal pertaining to its respective program which includes synchronizing signals derived from a common synchronizing source so that the picture signals provided by each of said sources are transmitted in unison. To this end , each television program source has associated therewith a corresponding synchronizing pulse generator 51, 52, 53 which is arranged to be locked to a common synchronizing source formed by a transmitter 54 providing an alternating-current signal of a predetermined frequency. The transmitter 54 may conveniently be one radiating a frequency standard transmission such for example as that radiated at a frequency of 200 kHz. by the B.B.C. Droitwich transmitter in the U.K. or one of the transmission radiated by the National Bureau of Standards transmitters from station WWV at Bolder, Colorado in the United States. The synchronizing pulse generators 51, 52, 53 may be locked to said common synchronizing source formed by the transmitter 54 by means of a respective radio receiving device 55, 56, 57, which is arranged to receive the frequency standard transmission from the transmitter 54 and provide an output signal having a frequency and phase locked with that of the signal received from the transmitter 54. Some commercially available receivers which are suitable for this purpose are the type OFS1 manufactured by Advance Electronics Ltd., the types 5090B and 5091A manufactured by Hewlett-Packard Ltd. and for the WWV transmissions the Gertsch model RLF-1 manufactured by The Singer Company and the model GSP manufactured by General Standards Corporation. The master oscillator in each synchronizing pulse generator 51, 52, 53 may be arranged to have its frequency controlled to maintain a predetermined fixed ratio with the output signal provided by its associated receiver 55, 56, 57 as may be required to control the synchronizing pulses of the television transmissions at the frequency required by the desired line standard.

If desired, the receiver 55 may also be arranged to provide an additional output which is connected to the oscillator 47 in respect of the carrier waves of the television programs applied to the wired network. Such an arrangement enables the frequency of the oscillator 47 to be controlled in a very precise manner, the precision of control being at least an order of magnitude better than attainable by the use of an oven controlled crystal drive. In a similar way the carrier waves transmitted by the broadcast television transmitters 42 and 43 may be locked to the transmission radiated by the frequency standard transmitter 54 by way of their associated receivers 56, 57. Such precision of control of the carrier wave frequencies of the transmitters 42 and 43 may prove advantageous in securing operation of the said transmitters on the same channel as other similar transmitters in a geographically adjacent area by arranging that the cochannel transmitters are operated with their carrier wave frequencies in precision offset. It will be appreciated that the transmitters operating in the same channel as the transmitters 42, and 43, will also require that their carrier wave frequencies are controlled in a similar manner by the frequency standard transmitter 54.

In all cases where the radiated broadcasting transmitters are arranged for the transmission of color television signals the frequency of the subcarrier wave utilized in the transmission of the color information component may be derived from the synchronizing signal generator associated with that color television transmitter so as to have a frequency which bears a fixed relationship to the frequency of the synchronizing signals. In this way it can be assured that the frequencies of the subcarrier wave in respect of the color information components of the various color television programs have identical frequencies thereby ensuring a minimum degree of interference between programs when transmitted over the wired network due to the undesired cross-coupling which may exist between the various conductor pairs of said wired network.

I claim:

1. A multiprogram wired system for broadcasting a plurality of differing signals which comprises a plurality of television signal sources each providing a different program, means providing with each of said television signals synchronizing signals derived from a common synchronizing source, modulator means for modulating each of said television signals with a common high-frequency wave locked to a frequency with a fixed relationship to the frequency of the synchronizing signals, means for energizing a separate pair of conductors in a wired network of said system with each television signal and a plurality of television receivers arranged for selective connection to said pairs of conductors of the wired network to derive therefrom one of said television signals.

2. A wired broadcasting system as claimed in claim 1, wherein the common synchronizing source comprises an alternating-current signal source, and a plurality of synchronizing pulse generators, one for each of said television sources locked to the alternating-current signal from said source.

3. A wired broadcasting system as claimed in claim 1, wherein the high-frequency carrier wave for each of the plurality of television signals is derived from a common high frequency oscillator device whereby the frequencies of the carrier waves of the television signals for said programs are identical.

4. A wired broadcasting system according to claim 1 wherein at least two of the plurality of television signal sources are arranged to provide color television signals which comprise a brightness information component arranged as a modulation of the corresponding carrier wave and a color information component arranged as a modulation of a subcarrier wave associated with said corresponding carrier wave, means associated with each of said two television signal sources serving to ensure that the frequencies of the subcarrier for each of said color television signals has the same, fixed, relationship to the frequency of the synchronizing signals whereby the color information components of the color television signals have identical subcarrier frequencies which are locked to that of the common synchronizing source.

5. A wired broadcasting system as claimed in claim 1, wherein the high frequency carrier wave for each of said television signals lies in the range 4—11 MHz.

6. A wired broadcasting system as claimed in claim 1, wherein the pairs of conductors of the wired network for each television signal are arranged as separate conductor pairs contained within a common cable.

7. A wired broadcasting system as claimed in claim 6 wherein the conductor pairs are twisted with each pair having a different pitch.

8. A transmitting apparatus for a wired broadcasting system for television signals which comprises a plurality of television signal sources each relating to a different program, synchronizing signal generator means coupled with each television signal source, an alternating-current signal source, means for making available at each television signal source said alternating signal, means for controlling the frequency and phase of the synchronizing signals provided by said synchronizing signal generator means at each television signal source in dependence upon the frequency and phase of said alternating-current signal whereby the television signals produced by each of said television signal sources are generated in unison, means for receiving at a wired broadcasting substation at least some of said plurality of television signals, means for translating the received signals to a common carrier wave frequency and means for applying said frequency translated television signals to different conductor pairs of a wired broadcasting cable network.

9. A transmitting apparatus as claimed in claim 8, wherein at least two of said television signal sources are arranged to provide color television signals wherein the color information component is transmitted as a modulation of a subcarrier wave and wherein means are provided for determining that the frequency of said subcarrier wave bears a fixed relationship to the frequency of the synchronizing signals provided by the synchronizing signal generator means at said television signal source, said color information subcarrier waves of the two color television signals thereby having identical frequencies.

10. A transmitting apparatus as claimed in claim 8, wherein the frequency of the carrier waves applied to the conductor pairs of said cable network is controlled in accordance with the frequency of a common oscillator device.

11. A transmitting apparatus as claimed in claim 10, wherein said common oscillator device is arranged to provide oscillations at a frequency determined by that of the alternating-current signal.

12. A transmitting apparatus as claimed in claim 10, wherein the frequency of said carrier waves lies in the range 4—11 MHz.

13. A transmitting apparatus as claimed in claim 8, wherein at least some of said television signal sources are arranged to provide television signals comprising a modulation component of a carrier wave, said carrier wave being provided by a carrier wave generating means having associated therewith frequency control means responsive to the frequency of said alternating-current signal whereby said carrier waves have frequencies which bear a fixed relationship to that of said alternating-current signal.

14. A transmitting apparatus as claimed in claim 13, wherein said source of alternating-current signal is provided by a frequency standard transmission.